Oct. 25, 1938.  C. H. WILL ET AL  2,134,648
AUTOMOBILE HEATER
Filed Aug. 9, 1935   3 Sheets-Sheet 1
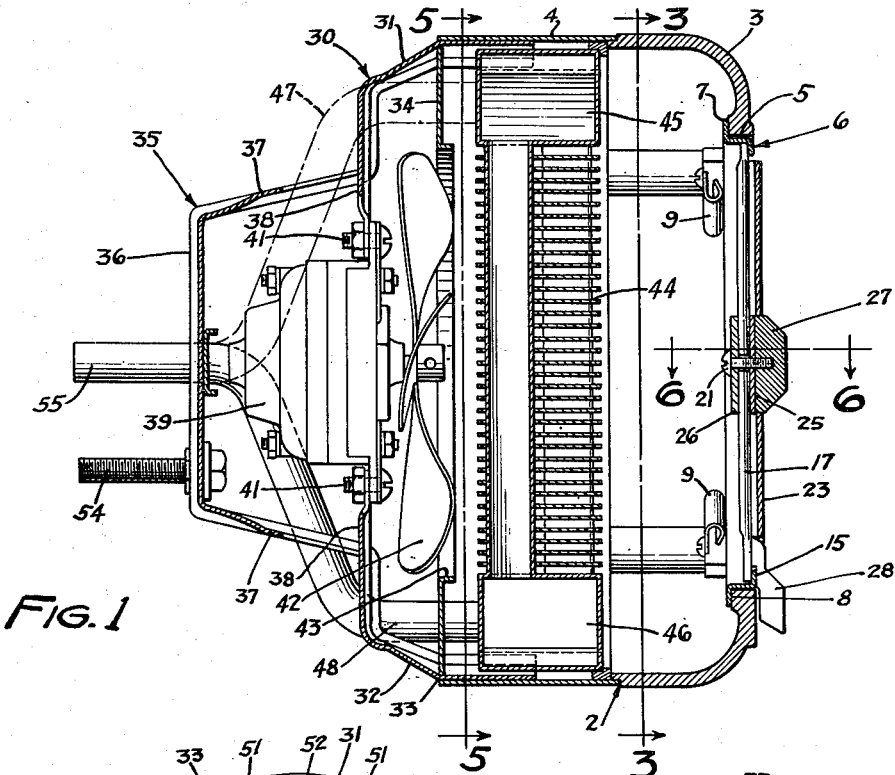
FIG. 1
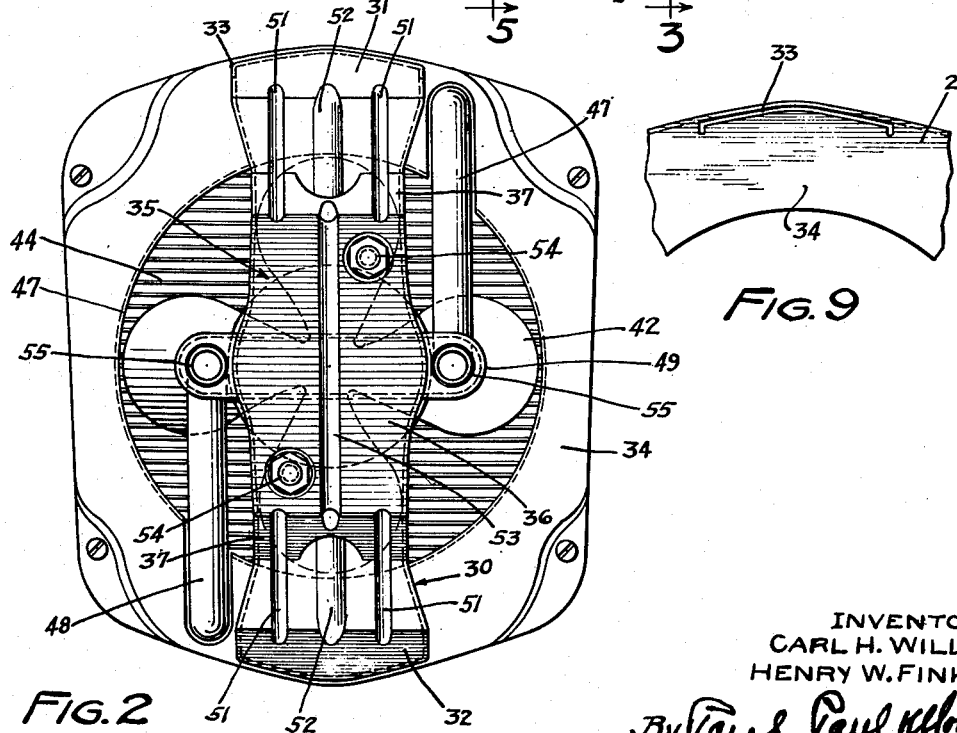
FIG. 2
FIG. 9
INVENTORS
CARL H. WILL
HENRY W. FINK
ATTORNEYS

INVENTORS
CARL H. WILL
HENRY W. FINK
ATTORNEYS

Oct. 25, 1938.       C. H. WILL ET AL       2,134,648
AUTOMOBILE HEATER
Filed Aug. 9, 1935        3 Sheets-Sheet 3

INVENTORS
CARL H. WILL
HENRY W. FINK

ATTORNEYS

Patented Oct. 25, 1938

2,134,648

UNITED STATES PATENT OFFICE 2,134,648

AUTOMOBILE HEATER

Carl H. Will and Henry W. Fink, Minneapolis, Minn., assignors to Tropic-Aire, Incorporated, Minneapolis, Minn., a corporation of Delaware Application August 9, 1935, Serial No. 35,494

6 Claims. (Cl. 98—2)

This invention relates to new and useful improvements in automobile heaters, and an object of the invention is to provide such a heater of simple and inexpensive construction, and which is adapted for either vertical or horizontal mounting.

A further object is to provide an automobile heater comprising a plurality of deflectors mounted for rotary and pivotal movement, and whereby they may be positioned for directing the air currents in any desired direction within the vehicle body, and which are provided with suitable finger grips or knobs, whereby they may be conveniently adjusted.

A further object is to provide a heater comprising a casing having an opening in the front thereof provided with suitable deflectors supported in an annular member adapted for rotary movement, whereby the deflectors may be positioned to deflect the air currents laterally or vertically, or in any desired direction.

A further object of the invention is to provide a heater of the class described, which is exceedingly strong and durable in comparison to its weight, and whose general design is such as to provide a very neat and attractive heater, well suited for use in automotive vehicles, and other places where such heaters may be employed.

Other objects of the invention reside in the specific construction of the deflectors and the manner of mounting them in the annular support, whereby they may readily be adjusted and, when necessary, be removed from the support for repairs or replacement; in the specific construction of the main supporting bracket of the heater, which is secured to the back shell of the heater casing by such means as welding, whereby it becomes, in effect, an integral part thereof; and which bracket is formed of sheet metal and is provided with inwardly projecting lugs, to which the motor is directly secured, and the rear portion of the bracket comprising means for supporting the usual inlet and outlet pipes of the heater core, whereby said pipes are supported in such a manner as to relieve the core of excessive strains, resulting from vibration and shocks; in the particular arrangement of the rear end portions of the inlet and outlet pipes, with respect to the bracket and the bolts for securing the heater in position in the vehicle body, whereby the heater is adapted for either vertical or horizontal mounting without altering the construction thereof; and, in the general construction of the heater as a whole.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 1 is a vertical sectional view showing the general construction of the heater;

Figure 2 is a rear view of Figure 1, showing the arrangement of the inlet and outlet pipes of the core with respect to the bolts for securing the heater in position;

Figure 9 is a fragmentary view showing the slots provided in the back shell of the heater for receiving the forwardly extending portion of the rear supporting bracket.

The novel heater herein disclosed, is shown comprising a housing or casing, generally indicated by the numeral 2, and consisting of a front shell 3, preferably of cast metal, and a back shell 4, shown formed of sheet metal.

Figure 7:
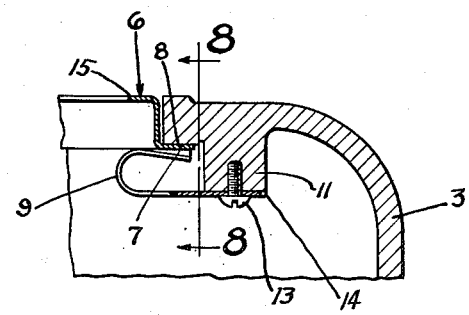
Figure 7 is an enlarged detail sectional view on the line 7—7 of Figure 3.
Figure 8:
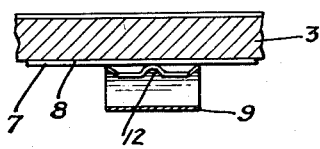
Figure 8 is a detail sectional view on the line 8—8 of Figure 7.

The front shell 3 has a suitable opening 5, through which heated air is circulated from the heater into the vehicle body. In this opening, there is mounted an annular supporting member, generally indicated by the numeral 6, and having at its inner side, an outwardly turned flange 7 adapted to seat against an inner annular seat 8 provided in the front shell 3. The supporting member 6 is shown frictionally supported on the seat 8 by a plurality of spring clips 9, secured to suitable bosses 11 provided in the shell 3 and having their free ends bearing against the flanges 7 of the supporting member, as best shown in Figures 7 and 8. The free ends of the spring clips 9 are preferably shaped, as shown in Figure 8, thereby to provide a small bead or rib 12 adapted to bear directly against the flange 7. The clips 9 may be secured to the shell 3 by suitable means, such as screws 13, and each clip is preferably seated in a recess 14, whereby they cannot relatively rotate and become displaced.

The annular supporting member 6 is provided at its front or outer side with an inwardly turned flange 15, to which is secured, in spaced relation, a plurality of rods 16, 17, and 18. Each rod consists of two parts, the adjacent ends of which are spaced apart, as best shown at 19 in Figure 3, to receive therebetween, suitable screws 21, as will subsequently be described.

Figure 3:
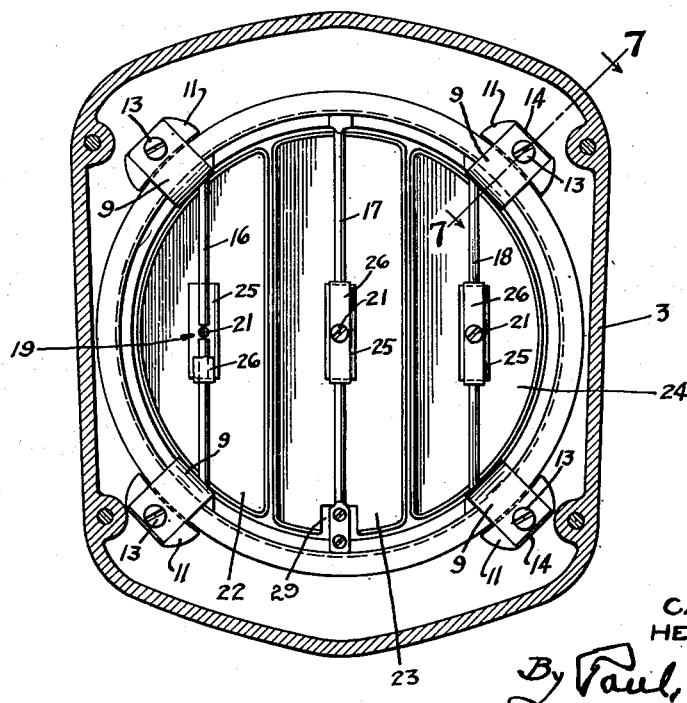
Figure 3 is a cross-sectional view on the line 3—3 of Figure 1.
Figure 5:
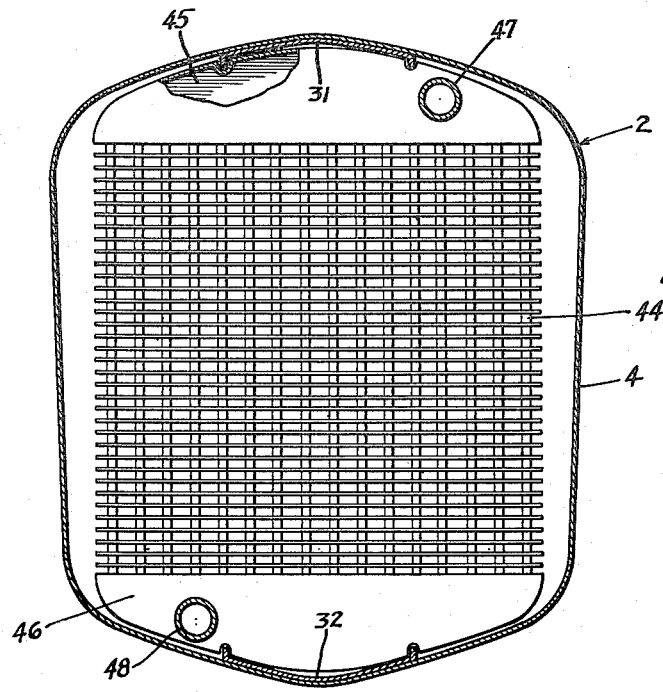
Figure 5 is a cross-sectional view on the line 5—5 of Figure 1.
Figure 6:
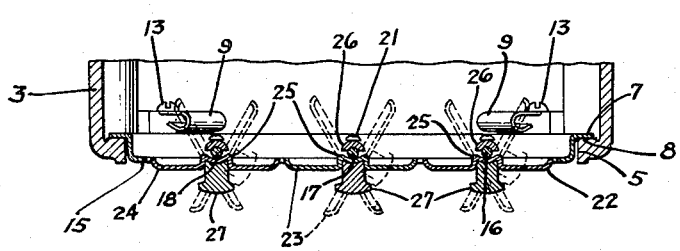
Figure 6 is a detail sectional view on the line 6—6 of Figure 1.

The rods 16, 17, and 18 provide means for supporting a plurality of deflectors 22, 23, and 24, which are mounted for relative rotation upon their respective rods, whereby they may readily be adjusted to the dotted line positions, shown in Figure 6, thereby to control the circulation of hot air from the heater. The means for securing the deflectors to the rods is best shown in Figures 1, 3 and 5, and consists of inwardly depressing a portion of the metal of each deflector, as shown at 25 in Figure 6. Each depressed portion 25 provides an elongated, concaved surface or seat against which the adjacent ends of the rods are seated, as will readily be understood by reference to Figures 3 and 6. The spacing between the ends of the sections of each rod is such as to substantially fit the diameter of the screws 21, as clearly illustrated in Figure 3.

Suitable clamping elements 26 engage the adjacent ends of the sections of each rod. These elements are apertured to receive the screws 21, the terminals of which are received in threaded engagement with suitable finger grips 27, seated in the depressions formed by inwardly bending portions of the metal of the deflectors, as hereinbefore stated. By thus securing the deflectors to the rods 16, 17 and 18, it will be noted that each deflector may be secured to its respective rod by a single screw 21, the deflectors being prevented from relatively rotating on the rods about the axis of the screw 21, because of the concaved seat provided by the depressed portions 25 of the deflectors, and also by reason of the clamping members 26 substantially fitting the peripheral surfaces of the rods, as clearly illustrated in Figure 6. It is also to be noted in this figure, that the finger grips or knobs 27 are prevented from relatively rotating because of being seated in the depressions formed in the front faces of the deflectors 22, 23 and 24.

By thus securing the deflectors to their respective rods, they may readily be rotated in either direction about the axes of the rods 16, 17, and 18, and they are retained in adjusted positions by the friction provided between the clamping members 26 and the concaved seats 25 of the deflectors. The friction between these parts may readily be varied by manipulation of the screws 21. It will also be noted by reference to Figure 3, that the deflectors cannot move lengthwise of the rods because of the terminals of each rod section being substantially engaged with the screws 21.

Figure 4:
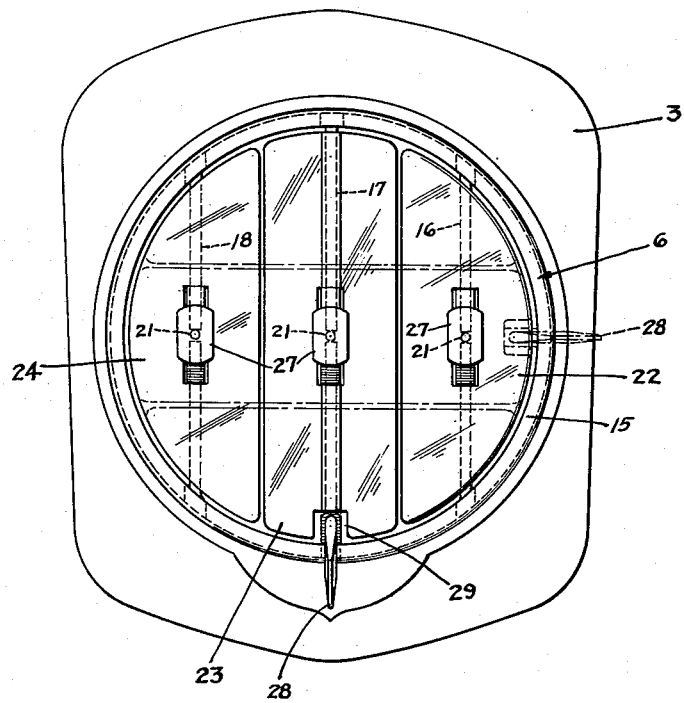
Figure 4 is a front view of the heater.

A suitable finger grip 28 is shown secured to the lower section of the center rod 17, and projects through an opening 29 provided in the deflector 23 and overhangs the outer face of the front shell 3, as shown in Figure 1, whereby it may be convenient to relatively rotate the deflectors about the axis of the circular opening provided in the front shell, as indicated in dotted lines in Figure 4.

A supporting bracket is provided at the rear of the heater for securing it to the vehicle body, and is generally indicated by the numeral 30. This bracket is shown formed of sheet metal and has forwardly extending upper and lower portions or legs 31 and 32, channel-shaped in cross-section, which are adapted to be received in correspondingly shaped slots 33 provided in the upper and lower portions of the back shell 4, which, it will be noted, is provided with an inwardly turned flange or wall 34. The slots 33 are provided adjacent the outer peripheral wall of the back shell 4, so that when the forwardly extending portions 31 and 32 of the bracket 30 are inserted therein and suitably welded thereto, they become, in effect, an integral part of the back shell, and will appear as being integrally formed therewith.

The bracket 30 is provided with a rearwardly extending portion 35 comprising a rear vertical wall 36, connected to the portion of the bracket by forwardly extending arms 37. The central portions of the arms 37 are shown bent inwardly to provide oppositely disposed lugs 38 adapted to support a suitable motor 39, shown secured directly to the lugs 38 by suitable bolts 41. The motor is provided with the usual fan 42, which is positioned in a circular opening 43 in the rear wall or flange 34 of the back shell 4. By thus securing the motor in position in the bracket 30, it will be noted that the body or frame of the motor cooperates with the lugs 38 to strengthen and stiffen the bracket 30, and, at the same time, the motor is rigidly supported within said bracket, whereby it cannot become disarranged with respect to the opening 43 in the rear wall 34 of the back shell.

The heater is provided with the usual water-circulating core 44, provided at its upper and lower portions with suitable tanks 45 and 46, having pipes 47 and 48, respectively, connected thereto. The core is suitably supported within the housing of the heater upon suitable rubber cushions, not shown, whereby it cannot vibrate or jar loose from road shocks, etc.

The pipes 47 and 48 are bent, as shown in Figures 1 and 2, and have their rear ends suitably supported in a cross member 49, shown secured to the rear wall 36 of the bracket 30, by such means as welding. In the drawings, I have shown the cross member 49 separately formed and secured to the back wall 36 of the bracket by such means as welding, but it is to be understood that, if desired, the oppositely projecting end portions of the cross member 49 may be integrally formed with the back wall 36 of the bracket 30 without departing from the scope of the invention. The only advantage gained by making the cross member separately and securing it to the rear wall 36 of the bracket is to economize in metal when the bracket is formed of sheet metal, as herein disclosed. The bracket is suitably ribbed by depressing portions of the metal thereof, as shown at 51, 52, and 53, to thereby strengthen it and prevent it from relatively bending or becoming distorted, when subjected to severe strains.

A feature of the invention resides in the particular construction and shape of the rear wall portion 36 of the bracket 30, which, it will be noted by reference to Figures 1 and 2, is small and compact, whereby the heater may be secured to a comparatively small wall surface of the vehicle body, the only portion of the heater engaging the supporting wall being represented by the rear wall 36 of the bracket. Suitable bolts or studs 54 are shown secured to the rear wall 36 adapted to be received in suitable apertures provided in the supporting wall of the vehicle body, thereby to secure the heater in position thereon. It is also to be noted that the rear end portions 55 of the water circulating pipes 47 and 48 project outwardly beyond the wall 36, whereby they may project through suitable apertures provided in the supporting wall of the vehicle body, a sufficient distance to permit the usual hose connections to be connected thereto within the engine chamber. Also, by arranging the water circulating pipes 47 and 48, and the bolts 54, as best shown in Figure 2, the heater is adapted for vertical or horizontal mounting, because the upper end of the pipe 47 which is connected to the upper tank 45 of the core 44, will be disposed above the pipe 48, in either position of the heater.

The novel heater herein disclosed is comparatively light in weight, is strong and rigid, and requires but a small space for mounting. It is exeremely simple in construction, and the deflectors 22, 23 and 24 are so arranged that they may be conveniently adjusted to direct the heated air into any desired portion of the vehicle body. By securing the forwardly extending arms 31 and 32 of the bracket 30 to the back shell 4, as herein shown and described, these arms become, in effect, an integral part of the shell, and a very sturdy and neat appearing structure is provided. Also, by supporting the rear ends of the water circulating tubes 47 and 48, as shown in Figures 1 and 2, shocks and vibrations imparted to the vehicle body are not transmitted to the core 44, whereby the danger of leakage is greatly minimized.

We claim as our invention:

1. In a heater of the class described, a casing having an opening in a wall thereof for the circulation of heated air, a plurality of rods positioned across said opening and each comprising two sections whose adjacent ends are spaced apart, a plurality of deflectors, means for frictionally securing the deflectors on said rods and whereby they may be rotatively adjusted thereon, said securing means comprising clamping elements and means on the deflectors cooperating with said clamping elements to embrace the adjacent ends of said rod sections, and clamping screws operatively connecting said clamping elements with their respective deflectors and traversing the gaps between said rod sections, thereby to prevent axial movement of the deflectors upon their respective rods.

2. In a heater of the class described, a casing having an opening in a wall thereof through which heated air may be circulated, a plurality of rods disposed across said opening and each comprising two axially alined sections having their adjacent ends spaced apart to provide a gap therebetween, a deflector adjustably supported upon each rod and each comprising a finger grip, a clamping element for each deflector, means on the deflector cooperating with said clamping elements to embrace the adjacent ends of their complemental rod sections, and a clamping screw operatively connecting together each clamping element, deflector, and finger grip, said screws traversing the gaps between the adjacent ends of said rod sections, thereby to prevent the deflectors from moving longitudinally on said rods.

3. In a device of the class described, a casing having an opening, an annular member fitting and rotatable in the opening and having a circumferential flange frictionally engaging the inner face of the casing marginally of the opening, and clips engaging the inner face of said flange to press the same against the inner face of the casing, each clip comprising a U-shaped member having one resilient leg yieldably pressing against said flange in the manner aforesaid.

4. In a heater of the class described, a casing having an opening in a wall thereof, an annular member mounted for rotary movement in said opening, friction means for retaining said member in adjusted position, a plurality of rods secured in said member and each comprising two sections, the adjacent ends of which are spaced apart, a deflector supported on each rod, and clamping devices for securing the deflectors to their complemental rods adapted to frictionally retain them in adjusted position thereon.

5. In a heater of the class described, a casing having an opening in a wall thereof, an annular member mounted for rotary movement in said opening, friction means for retaining said member in adjusted position, a plurality of rods secured in said member and each comprising two axially alined sections, the adjacent ends of the sections of each rod being spaced apart to provide a gap therebetween, a deflector supported on each rod, and clamping devices for adjustably securing the deflectors to their complemental rods, said clamping devices comprising means positioned in said gaps to thereby prevent the deflectors from axially moving on the rods.

6. In a heater of the class described, a casing having an opening in a wall thereof, a seat, an annular member having an outwardly turned flange engaging said seat, tension means for frictionally retaining said flange in engagement with the seat, thereby to support the member in adjusted position, a plurality of rods secured in the annular member and each comprising two axially alined sections whose adjacent ends are spaced apart to provide a gap therebetween, a deflector on each rod, and clamping devices for securing said deflectors to their complemental rods, said clamping devices embracing the adjacent ends of their respective rod sections and having means positioned in the gaps between said rod sections, thereby to prevent axial movement of the deflectors on the rods, and said clamping devices frictionally securing the deflectors to the rods whereby they may be relatively rotated thereon.

CARL H. WILL.
HENRY W. FINK.